Aug. 30, 1949.   J. G. FRANCIS   2,480,232
COFFEE BREWER FILTER
Filed Sept. 10, 1945   2 Sheets-Sheet 1
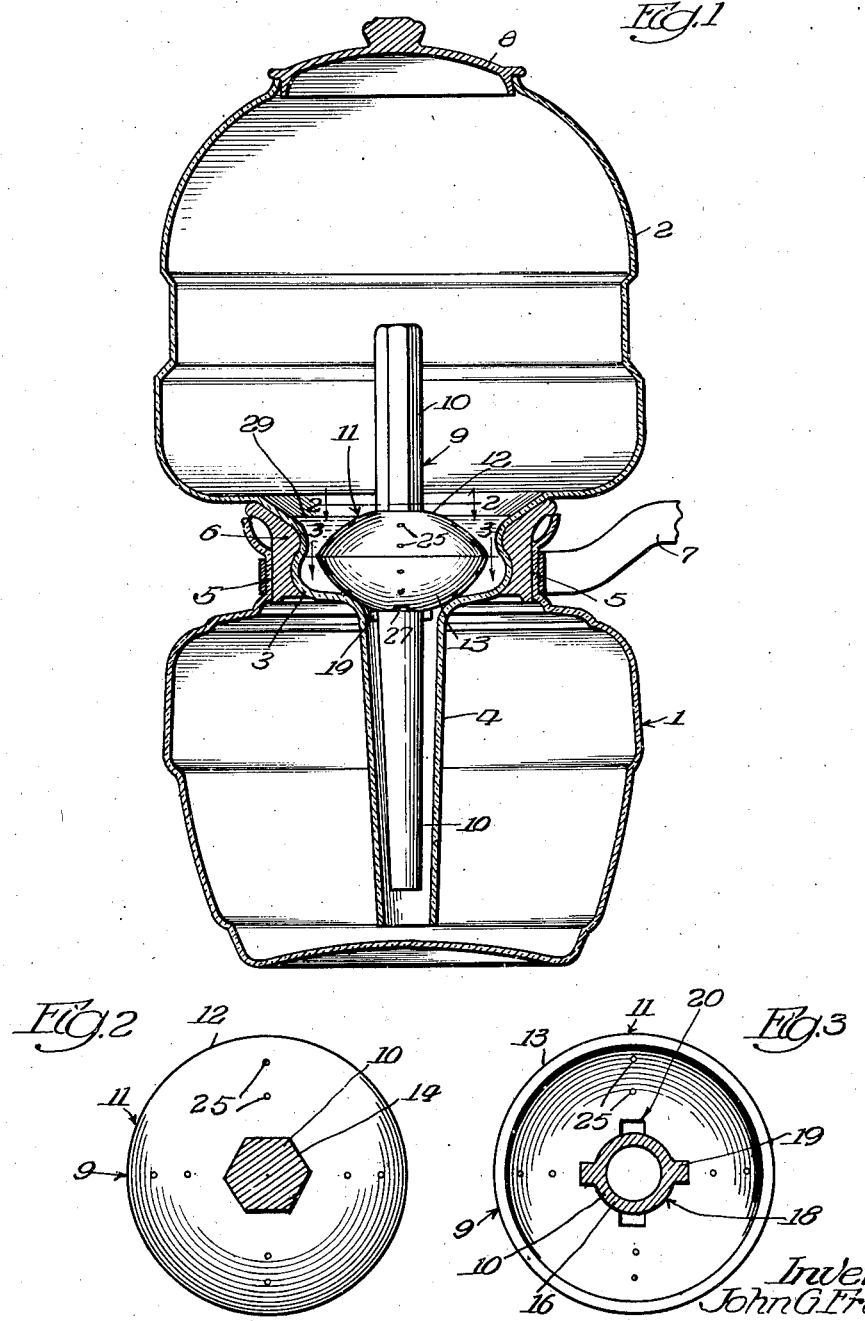
Inventor:
John G. Francis
By: Spencer, Marzall, Johnston + Cook,
Attys

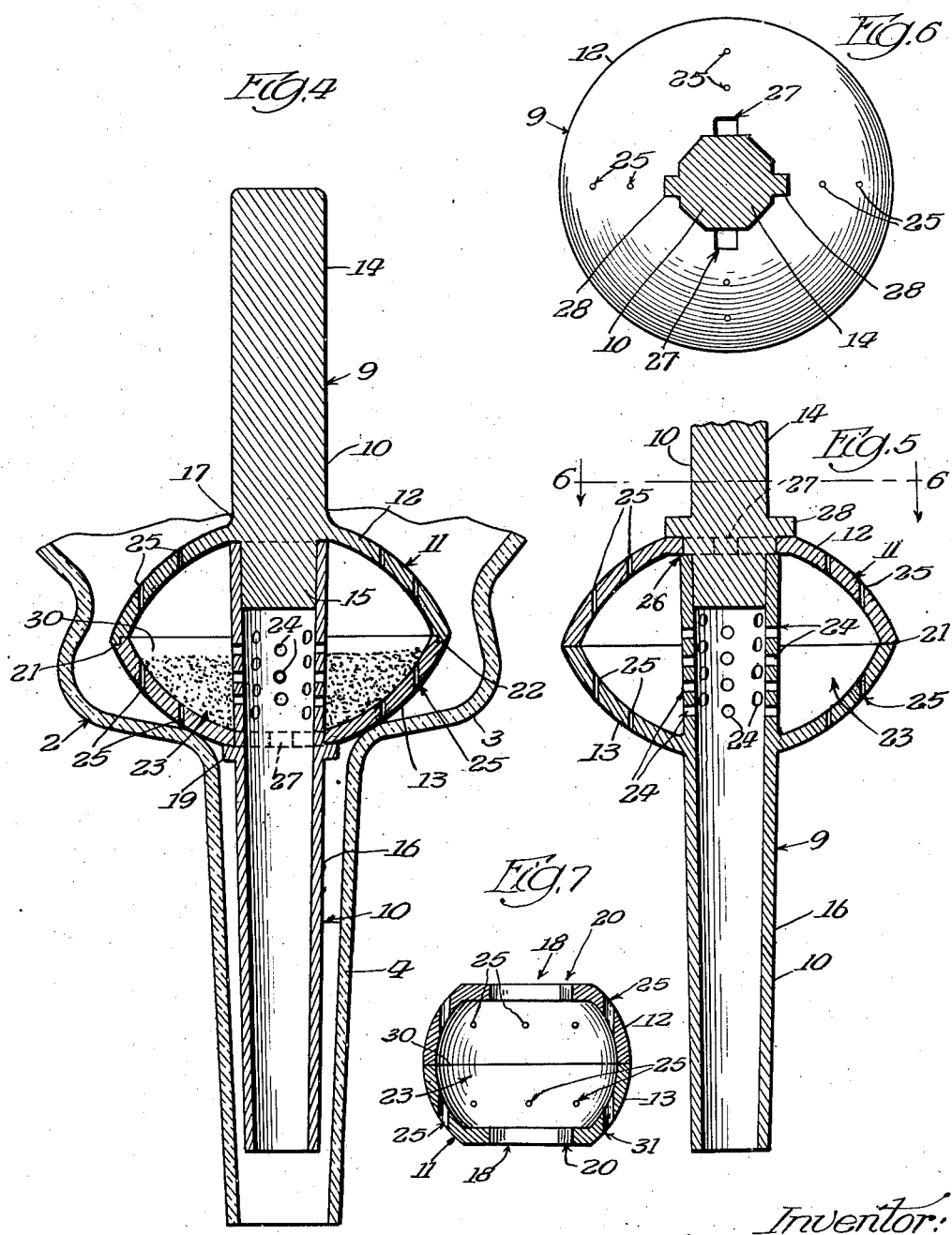

Patented Aug. 30, 1949

2,480,232

UNITED STATES PATENT OFFICE 2,480,232

COFFEE BREWER FILTER

John G. Francis, Chicago, Ill.

Application September 10, 1945, Serial No. 615,445

12 Claims. (Cl. 210—162)

This invention relates to beverage brewers and more particularly to brewers of the vacuum percolating type. More specifically, the invention relates to a valve strainer or filter member for such vacuum type percolator.

An important object of the present invention is to provide a valve or strainer member for brewers of the vacuum percolator type, the valve or strainer being preferably made of vitreous material and comprising a plurality of hollow elements mounted on a stem of preferably tubular shape, whereby coffee or other like material to be brewed is placed in an upper container and then strained by the gravity seated valve member.

Another important object of the invention resides in the provision of a gravity seated valve member for vacuum type percolators, whereby there is provided opposed cup-shaped elements so arranged as to provide a central compartment about a perforated stem, whereby the coffee or like material to be brewed may be arranged about the valve or within the compartment of the valve, and then strained when it returns to the lower container.

Numerous other objects and advantages will be apparent throughout the progress of the following specification.

The accompanying drawings illustrate selected embodiments of the invention and the views therein are, as follows:

Fig. 1 is a central vertical section through a vacuum type percolator having a valve in accordance with the present invention associated therewith;

Fig. 2 is a detail sectional view on the line 2—2 of Fig. 1;

Fig. 3 is a detail sectional view on the line 3—3 of Fig. 1;

Fig. 4 is a detail longitudinal sectional view showing the manner in which the improved valve or strainer member is arranged with respect to the upper container, the valve being shown in section and showing the coffee or other material to be brewed arranged inwardly of the cup-like members of the strainer or valve member;

Fig. 5 is a longitudinal sectional view through a modified form of strainer or valve member;

Fig. 6 is a detail sectional view on the line 6—6 of Fig. 5; and

Fig. 7 is a detail sectional view of a hollow perforate ball-like strainer or valve member apertured to receive removably the supporting valve stem.

The particular percolator herein shown for the purpose of illustrating the invention comprises a lower container 1 and an upper container 2. The upper container 2 has a generally cup-shaped part 3 of a reduced diameter at its lower end. The part 3 terminates in a tube 4 which extends downwardly into the lower container 1 and is open at its upper and lower ends.

The lower container 1 is provided with a reduced neck 5 adapted to receive removably the part 3 of the upper container 2. A gasket 6 of rubber or other like material surrounds the part 3 of the upper container and provides an airtight or hermetic seal between the upper and lower containers when the upper container is placed upon the lower container. The neck 5 of the lower container is preferably flared outwardly as shown in Fig. 1 to assist in filling the lower container with water and in pouring the brewed contents therefrom.

A handle 7 is operatively connected to the lower container, preferably at the neck 5, to facilitate in the use of the percolator. A top or closure 8 may also be provided to close the upper open end of the upper container 2.

The upper and lower containers, 2 and 1, respectively, are preferably made of glass or other vitreous material, and the ground coffee or other like material is placed in the cup-shaped part 3 of the upper container and about the valve or strainer member 9 or within the cavity of the strainer or valve member 9.

The valve member 9 is positioned between the lower part 3 of the upper container 2 and the upper end of the tube 4 for the purpose of straining coffee or other like material.

The improved valve 9 is gravity seated and, while it may be made of any suitable type of material, it is preferably made of vitreous material. This valve or strainer member comprises a valve stem 10 and a valve part or body 11. The gravity seated valve or strainer member 11 preferably comprises an upper inverted cup-shaped member 12 which cooperates with a lower cup-shaped member 13.

The valve stem 10 comprises an upper handle portion 14 which is preferably made solid and terminates into a reduced integral solid section 15. The lower end of the stem 10 is preferably made hollow as indicated at 16, and is secured at 17 to the lower reduced part 15 by any suitable material, such as Stellite. The upper inverted part 12 is preferably made integral with the handle portion 14 of the stem 10 although it may be made detachable, if desired.

The lower cup-like portion 13 of the valve or strainer member 9 may be removably mounted on the stem 10, as clearly shown in Figs. 1 to 4, inclusive. The lower end of the cup-shaped member 13 is provided with a central aperture 18 through which the stem 10 extends. The stem 10 is provided with outwardly extending projections or protuberances 19 which fit into complementary recesses 20 formed in the bottom of the cup member 13.

The lower end 16 of the stem 10 is passed through the central opening 18 with the integral projections or protuberances 19 fitting through the slots 20. The cup-like member 13 or the stem 10 may be given a part turn so that the protuberances 19 will be out of registration with the slots 20 whereby the cup-like member will be supported on its bottom by the protuberances 19, as clearly shown in Figs. 1 and 4.

The outer peripheral edge of the upper inverted cup-like member 12 is adapted to have contacting engagement with the upper peripheral edge of the lower cup-like member 13, as indicated at 21, Figs. 1 and 4. These contacting or engaging surfaces may be recessed or stepped, as indicated at 22, Fig. 4. The arrangement of the upper container with respect to the lower container provides a central compartment or chamber 23 which has communication with the interior of the tube-like part 16 of the stem 10, there being a plurality of openings or holes 24 provided through the walls of the tube part 16 to provide for such communication. The cups 12 and 13 are each provided with a plurality of apertures 25 to permit communication with the interior chamber or compartment 23.

The modification shown in Figs. 5 and 6 shows the lower cup-shaped member 13 secured to the hollow portion 16 of the stem but the upper cup-like member 12 is removable. The upper cup-like member 12 is provided with a central opening 26 with registering notches 27 formed thereabout to receive the outer projections 28 formed on the handle part 14 of the stem 10. The inverted cup-like member 12 is applied by bringing the slots or notches 27 into registration with the protuberances 28 and then given a part turn so as to secure the inverted cup 12 between the protuberances 28 and its lower contacting cup 13, as clearly shown in Fig. 5.

The invention provides a strainer or valve member of the gravity seated type which is adapted to seat in the reduced part 3 at the bottom of the upper container 2 with the hollow stem extending downwardly into the tube 4 so as to strain the beverage into the upper container as it flows back into the lower container. The coffee grounds or other material 29 may be put into the reduced portion 3, as clearly shown in Fig. 1, whereupon the water in the lower container 1 will come up through the tube 4 through the openings 24 in the tube and into the compartment 23. From the compartment 23 the water will flow through the openings 25 in the members 12 and 13 and comingle with the coffee grounds to saturate the coffee grounds. The brew, in returning to the lower container 1, will pass through the openings 25 in the cup-shaped members, the openings 24 in the stem 10, and then back into the lower container.

The invention also contemplates the use of the improved strainer or valve as means for receiving the coffee grounds or other material to be brewed, as indicated at 30, Fig. 4. In this latter embodiment, a predetermined amount of coffee or other material is adapted to be received in the lower cup-shaped member 13 whereupon the hot water from the lower container 1 will come up through the stem 10 through the holes 24 in the stem, saturate the coffee grounds 29, and then seep back into the lower container through the holes 25. The coffee grounds are receivable in the upper cup-shaped member 12 by first inverting the valve shaped members so that the grounds are received in the cup 12; the lower cup 13 is then applied in position, whereupon the valve member 9 is returned to its normal position and dropped in place on its seat in the part 3 of the upper container.

The upper cup 12, as shown in Figs. 5 and 6, is removable, whereby the coffee grounds may be put directly in the lower cup, after which time the upper cup is returned to position.

The invention contemplates the use of a gravity seated strainer or valve for filtering coffee or other like beverages whether the coffee grounds be put about the container, as shown in Fig. 2, or if put directly into the compartment 23, as clearly shown in Fig. 4. The surfaces of the contacting parts may be smooth or rough, as desired, so as to provide or prevent fluid from seeping through. Also, they may be flat or recessed, if desired.

The holes 25 in the cups are preferably vertical, that is, parallel to the axial center line of the stem so as to permit the device to be easily molded and removed from the mold. The stem 10 may be completely hollow with a closed upper end, but it is preferably made with the upper handle part 14 solid and hexagonal in cross section with the lower part hollow and either circular or multisided.

The two parts of the valve part 11 of the member 9 may be permanently united as at 30, Fig. 7, to form in effect a removable hollow ball-like member 31 which may be placed removably on the stem 10. A stem receiving aperture 18 is provided at the ends and each opening 18 terminates into a notch 20 to permit the projection 19 to pass so as to lock removably the member 31 to the stem 10. The ball-like member 31 is adapted to be inserted on the stem by inserting the stem through either end of the said member 31. The member 31 is hollow and has the openings 25 through the walls thereof for communication with the interior chamber 23 thereof. The chamber 23 has communication with the stem 10 through the openings or holes 24 in the same manner as described previously with respect to Figs. 1 to 6.

Water enters the upper bowl through the stem of the upper container. Some of the water passes between the bowl and the outside of the valve member 31, Fig. 7, but most of the water will flow through the openings 24 in the stem 10 into the chamber 23 where it will flow through the openings 25. Some of the water, too, will flow along the outside of the stem, between the stem and valve 31, as the valve is fitted loosely on the stem 10. The brewed beverage will flow from the upper bowl back into the lower bowl through the holes 25 into the compartment or chamber 23, through the holes 24, about the ball member 31 where it contacts with the bowl, and the space about the stem and member 31.

The construction disclosed in Fig. 7 is really the preferred form as it is a one-piece construction, is applied from either end and is adapted to be handled more readily and easily. Also chipping is averted by sealing the two halves 12 and 13 together.

Changes may be made in the form, construction and arrangement of the parts without departing from the spirit of the invention or sacrificing any of the advantages thereof, and the right is hereby reserved to make all such changes as fairly fall within the scope of the following claims.

The invention is hereby claimed as follows:

1. A gravity seated valve or filter for percolators, embodying a central stem and a pair of cup-shaped members of substantially the same size on said stem, and opposing each other to form a hollow chamber of substantial size, said stem having an open-ended tubular portion, one end of which stem extends into said chamber and being of a diameter considerably less than the interior diameter of the chamber, and provided with openings extending through a part thereof in communication with the chamber, said chamber having openings through the wall thereof to provide ingress and egress for fluid.

2. A gravity seated valve or filter for percolators, embodying a central stem and a pair of cup-shaped members of substantially the same size on said stem, and opposing each other to form a hollow chamber of substantial size, said stem having an open-ended tubular portion, one end of which stem extends into said chamber and being of a diameter considerably less than the interior diameter of the chamber, and provided with openings extending through a part thereof in communication with the chamber, said chamber having openings through the wall thereof to provide ingress and egress for fluid, one of said members being removable from said stem.

3. A gravity seated valve or filter for percolators, embodying a central stem, a pair of cup-shaped members of substantially the same size on said stem and opposing each other to form a chamber of substantial area, said stem having an open end and a hollow portion extending into and having openings in said portion communicating with said chamber, said cup-shaped members also having openings through their walls for ingress and egress of liquid, one of said cup-shaped members being removable from said stem, and means to removably mount the last said cup-shaped member upon said stem, said means embodying an opening in the wall of one of said members and a projection on the stem adapted to be passed through the last said opening.

4. A gravity seated filter or valve for vacuum-type percolators, embodying a hollow ball-like member of substantial size, having alined openings in its wall, a stem passing through said openings and of a diameter considerably less than the diameter of the interior of the said member, said stem having a hollow portion extending into said member, said stem also having openings through its wall communicating with the interior of the ball-like member, there being fluid circulation openings through the wall of said ball member.

5. A gravity seated filter or valve for vacuum-type percolators, embodying a hollow ball-like member of substantial size, having alined openings in its wall, a stem passing through said openings and of a diameter considerably less than the diameter of the interior of the said member, means removably mounting the member on said stem, said stem having a hollow portion extending into said member, said stem also having openings through its wall communicating with the interior of the ball-like member, there being fluid circulation openings through the wall of said ball member.

6. A gravity seated valve or filter for percolators, embodying a central stem, a pair of cup-shaped members of substantially the same size on said stem and opposing each other to form a chamber of substantial area, said stem having an open end and a hollow portion extending into and having openings in said portion communicating with said chamber, said cup-shaped members also having openings through their walls for ingress and egress of liquid, one of said cup-shaped members being removable from said stem, means to removably mount the last said cup-shaped member upon said stem, said means embodying an opening in the wall of one of said members and a projection on the stem adapted to be passed through the last said opening, and a handle connected to said chamber.

7. A filter embodying a pair of opposed cup-shaped members forming a chamber having fluid passages through its wall, a tubular stem to which the lower member is connected, said stem extending into and terminating within the chamber and being of a diameter considerably less than the interior diameter of the chamber, there being openings through the wall of the stem forming communications between the chamber and the stem, and a handle connected with the other of said cup-shaped members and engaging said stem.

8. A filter embodying a pair of opposed cup-shaped members forming a chamber having fluid passages through its wall, a tubular stem to which the lower member is connected, said stem extending into and terminating within the chamber and being of a diameter considerably less than the interior diameter of the chamber, there being openings through the wall of the stem forming communications between the chamber and the stem, a handle connected with the other of said cup-shaped members and engaging said stem, said cup-shaped members being separable, and means for detachably securing one of said members to said stem.

9. A filter embodying two opposed cup-shaped members forming a chamber of substantial size, having fluid apertures through its wall, an open-ended tubular stem to which one of said members is connected, one end of the stem passing into and terminating within the chamber, said end being of a diameter considerably less than the diameter of the interior of the chamber, the last said end of the stem having fluid passages through its wall forming direct communication between the chamber and the interior of the stem, and a handle member passing through the other of said members and engaging the stem.

10. A filter embodying two opposed cup-shaped members forming a chamber of substantial size, having fluid apertures through its wall, an open-ended tubular stem to which one of said members is connected, one end of the stem passing into and terminating within the chamber, said end being of a diameter considerably less than the diameter of the interior of the chamber, the last said end of the stem having fluid passages through its wall forming direct communication between the chamber and the interior of the stem, and a handle member passing through the other of said members and telescoping with the end of said stem.

11. A filter embodying two opposed cup-shaped members forming a chamber of substantial size, having fluid apertures through its wall, an open-ended tubular stem to which one of said members is connected, one end of the stem passing into and terminating within the chamber, said end being of a diameter considerably less than the diameter of the interior of the chamber, the last said end of the stem having fluid passages through its wall forming direct communication between the chamber and the interior of the stem, a handle passing through the other of said cup-shaped members and engaging the end of said stem, and means for detachably securing said handle in position.

12. A filter embodying two opposed cup-shaped members forming a chamber of substantial size, having fluid apertures through its wall, an open-ended tubular stem to which one of said members is connected, one end of the stem passing into and terminating within the chamber, said end being of a diameter considerably less than the diameter of the interior of the chamber, the last said end of the stem having fluid passages through its wall forming direct communication between the chamber and the interior of the stem, a handle member passing through the other of said members and engaging the stem, and means individual to the cup-shaped members for respectively and detachably securing them in position with relation to said stem.

JOHN G. FRANCIS.

REFERENCES CITED

The following references are of record in the file of this patent:

UNITED STATES PATENTS

| Number | Name | Date |
| --- | --- | --- |
| 2,027,826 | Keaton | Jan. 14, 1936 |
| 2,234,678 | Matson | Mar. 11, 1941 |
| 2,386,433 | Carter et al. | Oct. 9, 1945 |
| 2,390,269 | Peterson | Dec. 4, 1945 |